(12) United States Patent
Kraus et al.

(10) Patent No.: US 10,111,389 B2
(45) Date of Patent: Oct. 30, 2018

(54) NON-STOP BALING SYSTEM

(71) Applicant: DEERE & COMPANY, Moline, IL (US)

(72) Inventors: Timothy Kraus, Blakeburg, IA (US); Dennis Johnston, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 141 days.

(21) Appl. No.: 15/145,982

(22) Filed: May 4, 2016

(65) Prior Publication Data

US 2017/0318749 A1 Nov. 9, 2017

(51) Int. Cl.
*A01F 15/07* (2006.01)
*A01F 15/08* (2006.01)

(52) U.S. Cl.
CPC ...... *A01F 15/0705* (2013.01); *A01F 15/0715* (2013.01); *A01F 15/085* (2013.01); *A01F 15/0883* (2013.01)

(58) Field of Classification Search
CPC .............. A01F 15/0705; A01F 15/0715; A01F 15/0825; A01F 15/085; A01F 15/0883; A01F 2015/076
See application file for complete search history.

(56) References Cited

U.S. PATENT DOCUMENTS

| | | | | |
|---|---|---|---|---|
| 4,914,900 A | * | 4/1990 | Viaud | A01F 15/0705 100/88 |
| 5,109,652 A | * | 5/1992 | Viaud | A01F 15/0715 53/505 |
| 5,152,123 A | * | 10/1992 | Viaud | A01F 15/0715 100/4 |
| 6,729,118 B2 | | 5/2004 | Viaud | |
| 7,043,892 B1 | | 5/2006 | Kessler | |

(Continued)

FOREIGN PATENT DOCUMENTS

| | | |
|---|---|---|
| DE | 2224717 A1 | 11/1973 |
| DE | 102011109893 A1 | 2/2013 |

(Continued)

OTHER PUBLICATIONS

Screen shot from "Lely Welger Continuous Baler how it works" video; last accessed from https://www.youtube.com/watch?v=ErTQIvySnHg on May 11, 2016, video time 0:50, 1 page.

(Continued)

*Primary Examiner* — Robert E Pezzuto
*Assistant Examiner* — Adam J Behrens
(74) *Attorney, Agent, or Firm* — Taft Stettinius & Hollister LLP; Stephen F. Rost (57) ABSTRACT

An agricultural baler system having a direction of travel and adapted to compile a windrow of crop into a bale, the agricultural baler system having a baler assembly coupled to the work machine and configured to consolidate crop from the underlying windrow into the bale, the baler assembly implementing a wrapping process to maintain the form of the bale and an eject process for ejecting the bale, and a windrow diverter selectively positionable between a divert position and a bypass position. Wherein, when the windrow diverter is in the divert position, the underlying windrow is repositioned as the baler assembly moves in the direction of travel.

11 Claims, 6 Drawing Sheets

(56) References Cited

U.S. PATENT DOCUMENTS

| | | | |
|---|---|---|---|
| 8,707,865 B2* | 4/2014 | Oakes | A01F 15/106 100/35 |
| 2016/0014969 A1 | 1/2016 | Kraus et al. | |
| 2017/0202151 A1* | 7/2017 | Smith | A01F 15/0705 |

FOREIGN PATENT DOCUMENTS

| | | | | |
|---|---|---|---|---|
| DE | 102011118125 A1 * | 5/2013 | | A01F 15/0705 |
| FR | 1176042 A | 4/1959 | | |
| FR | 2094849 A7 | 2/1972 | | |

OTHER PUBLICATIONS

European Patent Office, Extended European Search Report issued in Application No. 17169286.6, dated Aug. 14, 2017, 5 Pages, Munich, Germany.

* cited by examiner

NON-STOP BALING SYSTEM

FIELD OF THE DISCLOSURE

The present disclosure relates to a baling system, and in particular, to a baling system that continuously moves during the baling process.

BACKGROUND OF THE DISCLOSURE

A cut and raked crop that has been dried or otherwise prepared in a field, such as hay, straw or other agricultural material is often gathered, compressed and shaped by an agricultural baler or other similar device. There are several types of balers that are commonly used, each resulting in different types of bales. Some are rectangular and some are cylindrical of various sizes. Bales can be bound with netting, strapping, wire or twine. A bale is often dropped in the field by the baler for later retrieval, as the baling system moves through the field.

Many baler systems travel over windrows defined by the raked crop and lift the crop into a chamber. The chamber compresses and shapes the crop into one of the various sizes described above. In many baler systems, once the chamber is full, the baler system stops to allow the compressed crop in the chamber to be bound and discharged.

Alternatively, some baler systems have a chamber that can bind and discharge one bale while simultaneously beginning a second bale. These baler systems can continuously feed crop into the chamber and do not require stopping during the bind and discharge steps.

Round balers rotate gathered crop material until a sufficiently large enough cylinder-shaped "round" or "rolled" bale is formed and that bale is secured with twine or wrapping. The back of the baler swings open, allowing the bale to be discharged. Variable-chamber balers can produce bales from 48 to 72 inches in diameter and up to approximately 62 inches in width. The bales can weigh from 1,000 to 2,200 pounds, depending upon size, material, and moisture content.

Conventional crop accumulators group the bales while the baling operation is underway. When the crop accumulator is full, it is common to dump the harvested crop in the location where it is full. For example, a crop accumulator, which looks somewhat like a trailer is connected directly behind the baler and may collect and transport three round bales, allowing groupings of up to four bales at a time (counting the bale in the baler). These types of crop accumulators accumulate the bales in a sequential manner relative to the direction of travel of the baler. The crop accumulator may have a floor chain system in order to move the bale that it receives from the baler to a sequential position on the accumulator.

SUMMARY

One embodiment may be an agricultural baler system having a direction of travel and adapted to compile a windrow of crop into a bale, the agricultural baler system comprising a baler assembly coupled to the work machine and configured to consolidate crop from the underlying windrow into the bale, the baler assembly implementing a wrapping process to maintain the form of the bale and an eject process for ejecting the bale; and a windrow diverter selectively positionable between a divert position and a bypass position; wherein, when the windrow diverter is in the divert position, the underlying windrow is repositioned as the baler assembly moves in the direction of travel.

In one example, when the baler assembly is executing the wrapping and eject process, the baler assembly continues to move in the travel direction and transmits a divert signal.

In another example, the baler assembly continues to move in the travel direction and transmits a bypass signal when the baler assembly has completed the wrapping and eject process.

In another example, the windrow diverter selectively distributes the underlying windrow to either a first side or a second side of the baler assembly.

In another example, the windrow diverter does not substantially reposition the underlying windrow as the baler assembly moves in the direction of travel when the windrow diverter is in the bypass position and when the windrow diverter is in the divert position the windrow diverter diverts the underlying windrow away from the baler assembly as the baler assembly moves in the direction of travel.

In another example, the divert signal and the bypass signal are visual or audio signals.

In another example, a controller is in communication with the baler assembly and the windrow diverter; wherein the controller selectively transitions the windrow diverter between the divert position and the bypass position; further wherein, the divert signal is communicated to the controller and the controller transitions the windrow diverter to the divert position responsive thereto; further wherein, the bypass signal is communicated to the controller and the controller transitions the windrow diverter to the bypass position responsive thereto.

In another example, the windrow diverter and the baler assembly are coupled to a work machine; further wherein, the windrow diverter is coupled to the work machine at a forward location relative to the baler assembly along the direction of travel.

Another embodiment of a baler system, comprises a baler having a crop pickup; and a windrow diverter having a divert position and a bypass position; wherein, the crop pickup gathers crop from an underlying windrow into the baler as the baler moves in a direction of travel along the windrow; further wherein, a first signal indicates to position the windrow diverter in the divert position to reposition the windrow of underlying crop away from the crop pickup when the baler is executing a wrap or eject cycle as the baler moves in the direction of travel.

In one example the windrow diverter is biased towards a first side or a second side of the baler. Further, the windrow diverter is selectively positionable towards the first side or the second side.

In another example, the windrow diverter is coupled to a tractor at a location leading the baler as the tractor travels in the direction of travel.

In another example, the first signal is an audio or visual signal.

In another example, a second signal indicates to position the windrow diverter in the bypass position when the wrap or eject cycle is complete. Further, the second signal is an audio or visual signal.

In another example the baler system comprises a controller in communication with the windrow diverter, and the baler; wherein, the controller generates the first signal when the baler is about to begin a wrapping and eject cycle; further wherein, the controller selectively repositions the windrow diverter into the divert position responsive to the first signal.

Another embodiment may include a control system for non-stop baling of crop in a windrow, comprising a drive system configured to move in a direction of travel; a baler coupled to the drive system; a windrow diverter having a divert position and a bypass position coupled to the drive system; a controller in communication with a plurality of inputs and with the drive system, the baler, and the windrow diverter; a control algorithm executable by the controller; wherein, the control algorithm communicates with the plurality of inputs to identify the available capacity of the baler and the position of the windrow diverter; further wherein, the control algorithm generates a signal when the baler is approaching full capacity to position the windrow diverter in the divert position; further wherein, baler executes a wrap cycle while the control algorithm generates the signal; further wherein, the tractor continues to move in the direction of travel while the control algorithm generates the signal.

In one example, the signal generated by the control algorithm is a visual or audio signal.

In another example, the signal generated by the control algorithm is a command communicated to the windrow diverter to move to the divert position.

In another example, the signal generated by the controller is communicated to the drive system to reduce the speed of the baler.

In another example, the controller communicates with at least one sensor to identify a fill-rate of crop into the baler; further wherein, a distance between the baler and the windrow diverter is defined in the controller; further wherein, a baler speed is communicated to the controller; further wherein, the control algorithm implements the fill-rate, vehicle speed, and distance to send the signal before the baler is full.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
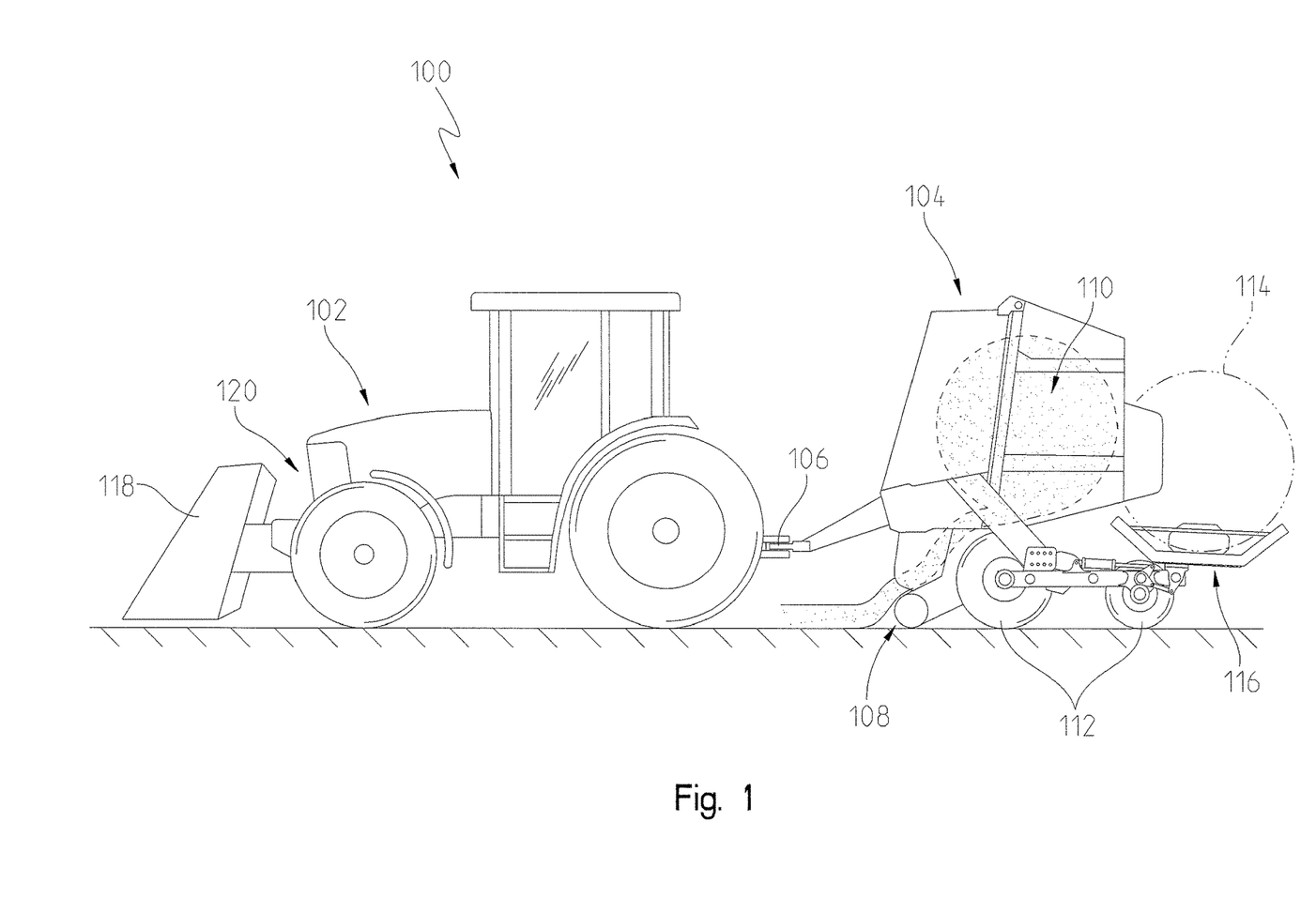
FIG. 1 is a side view of a baler system.

Referring to FIG. 1, a baling system 100 is shown. The baling system 100 may have a tractor 102 or other work machine coupled to a baler 104. The baler 104 is connected to the tractor 102 by way of a hitch 106, thereby providing towing for the movement of the baler 104. However, the baler 104 may be coupled to the tractor 102 in any way known to a person having skill in the relevant art. Further still, the baler 104 shown and described herein may have a drive system integrally formed therein. The baler 104 may have a prime mover coupled to one or more ground-engaging mechanisms that allow the baler 104 to move relative to the underlying surface. In other words, while the baler 104 is shown and described throughout as being coupled to a tractor 102 or other work machine, this disclosure also considers embodiments where the baler 104 has a drive system integrally formed therein such that the baler 104 is not coupled to a separate tractor or work machine.

The tractor or work machine 102 may also include its own drive system such as an engine, prime mover, transmission, and the like. The tractor or work machine 102 may include a plurality of ground-engaging mechanisms such as wheels for propelling the machine along a direction of travel. The tractor or work machine 102 may also include a frame or chassis to which the drive system and plurality of ground-engaging mechanisms are coupled. An operator's cab may be coupled to the frame or chassis, and controls may be provided in the cab for controlling an operation of the tractor or work machine 102. A seat or chair may be provided to allow an operator to be positioned in the cab to operate the machine. Any conventional tractor or work machine may be used and is thus contemplated as part of the baling system 100.

In one embodiment of the present disclosure, the baler 104 includes a debris or crop pickup 108, a cavity 110, and at least one ground engaging support 112. The crop pickup 108 may receive debris or crop material as the baling system 100 traverses the ground and forms a bale 114 from the debris or crop material. The debris or crop directed into the cavity 110 with the crop pickup 108 may be rolled into a spiral shape to form a round cylindrical bale, tied and subsequently deposited onto a crop accumulator 116 or the ground after a wrap and eject cycle.

In one non-exclusive example, the cavity may be surrounded by compression elements in the form of a single compression belt or a plurality of compression belts, the adjacent edges of which butt directly against one another. The compression elements may rest on a drivable roll and freely running rolls. While the cavity 110 is peripherally surrounded substantially by the compression elements, it may be closed laterally by side walls.

While the baler 104 is shown and described herein as relating to crop material, this disclosure applies to any device that travels along an underlying surface accumulating, consolidating, binding, and discharging the underlying debris. In one non-exclusive example, this disclosure is applied to a device that captures, and consolidates waste such as debris accumulated along public streets. Accordingly, this disclosure is not limited to conventional balers but rather is considered appropriate for any device that gathers any type of debris from an underlying surface or the like.

The cavity 110 may be followed by a crop accumulator or bale carriage 116. The crop accumulator 116 may allow for one or more bale 114 to be towed by the baler 104 until it passes a desired drop point. At the drop point, the baler 104 may release the bales 114 in the crop accumulator 116 onto the underlying surface. In one embodiment, the crop accumulator 116 may release the bales 114 so they are restricted from substantially rolling along the field.

The tractor 102 or baler 104 may also have a windrow diverter 118 coupled thereto. The windrow diverter 118 may be selectively positionable between a first or divert position and a second or bypass position. In the divert position, the windrow diverter 118 may be provided power and positioned to manipulate any crop positioned thereunder and move the crop out of the path of the crop pickup 108. The windrow diverter 118 may be sized to transfer the underlying crop to an adjacent windrow. In this embodiment, the baling system 100 diverts the crop from the underlying windrow to an adjacent windrow to be collected by the baler 104 when it travels along the adjacent windrow.

When the windrow diverter 118 is in the bypass position, it may not move the crop away from the path of the crop pickup 108. In this configuration, as the tractor 102 travels along a windrow, the windrow diverter 118 may not be provided power and does not contact the crop positioned in the windrow. Rather, the crop is collected by the crop pickup 108 as the baling system 100 travels along the windrow. In one embodiment, the windrow diverter 118 may rise above the underlying windrow in the bypass position. In another embodiment, the windrow diverter 118 may slide to one of the adjacent sides of the windrow while in the bypass position. In yet another embodiment, the windrow diverter 118 may not move positions at all but rather rotate at a consistent speed with the underlying surface to not substantially affect the position of the windrow as the windrow diverter 118 passes thereby.

Figure 2:
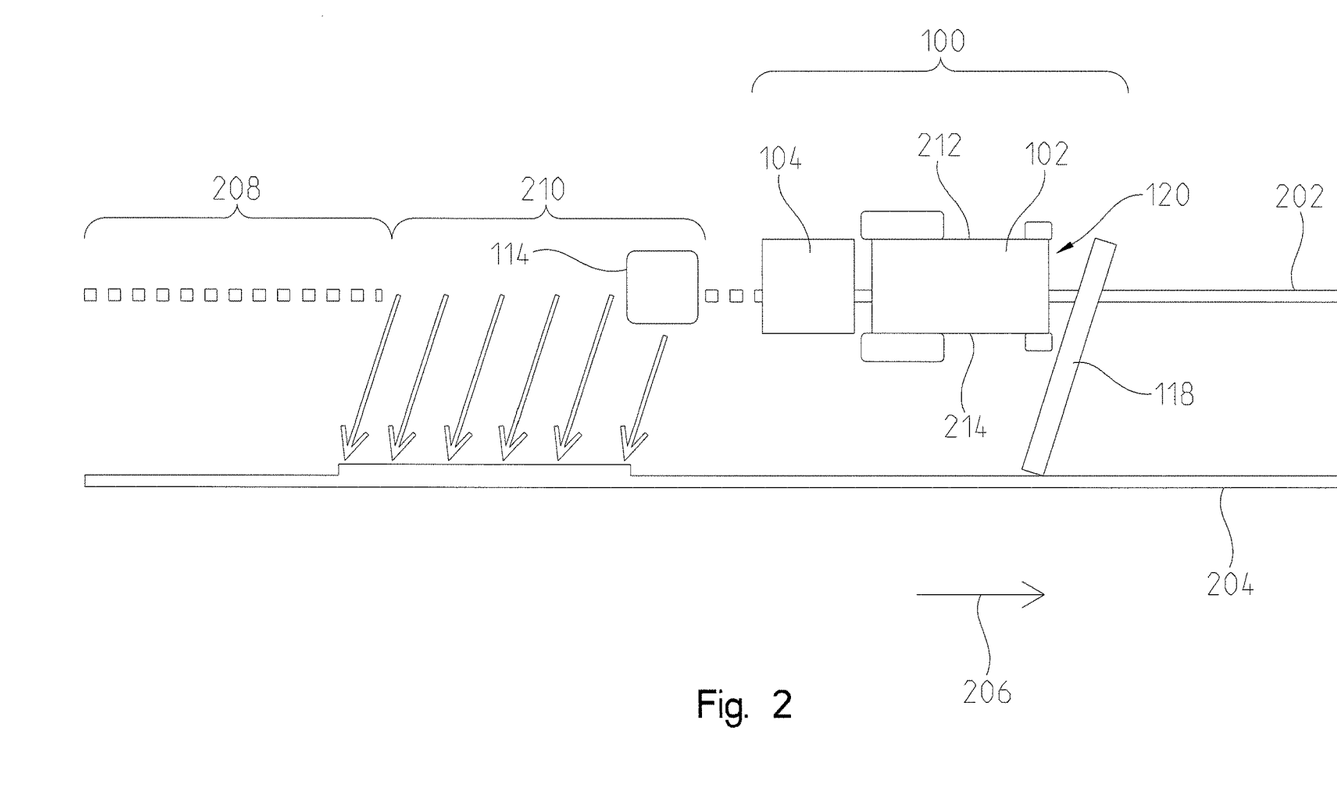
FIG. 2 is a schematic top view of the baler system on a windrow.

Now referring to FIG. 2, the baling system 100 is shown on a first windrow 202 of crop. A second windrow 204 of crop may be positioned adjacent to the first windrow 202 as is common in the agricultural industry. In FIG. 2, the baling system 100 may be moving in a direction of travel 206 or towards a leading end of the tractor 102 while implementing the teachings of this disclosure. More specifically, the baling system 100 may have traveled over a first section 208 in the direction of travel 206 with the windrow diverter 118 in the bypass position. As the baling system 100 moves along the first section 208, the crop in the first section 208 of the first windrow 202 may be repositioned by the crop pickup 108 into the cavity 110.

When the cavity 110 is about full, the baling system 100 may position the windrow diverter 118 in the divert position while the baling system 100 moves along a second section 210 in the direction of travel 206. As the baling system 100 moves along the second section 210, the windrow diverter 118 may reposition the crop in the first windrow 202 away from the crop pickup 108 and towards the second windrow 204 while the baler 104 binds and ejects the bale 114 from the cavity 110.

After the bale 114 is ejected or otherwise discharged from the cavity 110, the baling system 100 may reposition the windrow diverter 118 in the bypass position and allow the crop from the first windrow 202 to be repositioned into the cavity 110 via the crop pickup 108 as the baling system 100 moves in the direction of travel 206 for the first windrow 202. The above-described cycle can be repeated as the cavity 110 is filled with crop from the underlying first windrow 202. Further, the baling system 100 can utilize the same process described above for the second windrow 204.

In one aspect of this present disclosure, the baling system 100 may travel along the underlying surface at a substantially constant velocity regardless of whether the cavity 110 is empty or full and being ejected. More specifically, the windrow diverter 118 may be transitioned to the divert position just prior to the cavity 110 becoming full. In the embodiment shown in FIG. 2 and described above, the portions of crop from the windrow that cannot be positioned within the cavity 110 are diverted to the adjacent windrow to be picked up by the baler 104 as it travels along the adjacent windrow.

In another embodiment, however, the speed of the baling system 100 may be reduced when the windrow diverter 118 is in the divert position. More specifically, in one non-exclusive example the baling system may travel at about 8-14 MPH when the windrow diverter 118 is in the bypass position and the baler 104 is accumulating crop. When the baler 104 is almost full, the speed of the baling system 100 may be reduced to about 1-4 MPH while the windrow diverter 118 is in the divert position. By reducing the speed of the baling system 100 while the windrow diverter 118 is in the bypass position, the amount of crop or other debris being diverted from the underlying windrow is reduced, thereby limiting additional crop or other debris to be processed at the adjacent windrow.

In another non-exclusive embodiment of this disclosure, the windrow diverter 118 may be coupled to the tractor 102 at a front portion 120. The front portion 120 of the tractor 102 may be the leading portion as the tractor 102 moves in the direction of travel 206. In another embodiment, the windrow diverter 118 may be coupled to the left or right side or the bottom or underside of the tractor 102 between the front and rear wheels. In yet another embodiment, the windrow diverter 118 may be coupled to a rear side of the tractor 102 behind the rear wheels, but in front of the baler 104. Further, the windrow diverter 118 may be positionable to become biased towards either a first side 212 or a second side 214 of the baler 104. In one embodiment, the windrow diverter 118 can be positioned on the same side of the tractor 102 as the adjacent windrow. Further, as the tractor 102 completes one windrow, it may turn substantially 180 degrees to process the crop of the adjacent windrow. During the 180 degree turn, the tractor 102 may also reposition the windrow diverter 118 to the opposite side of the tractor 102 to ensure the windrow diverter 118 will divert the crop towards the adjacent windrow when in the divert position.

In one non-exclusive example, the windrow diverter 118 may be sufficiently sized to move the crop from the first windrow 202 to the second windrow 204 during the second section 210. However, the windrow diverter 118 is not limited to such a configuration. In a different embodiment, the windrow diverter 118 only moves the crop from the underlying windrow out of alignment with the crop pickup 108.

Figure 3:
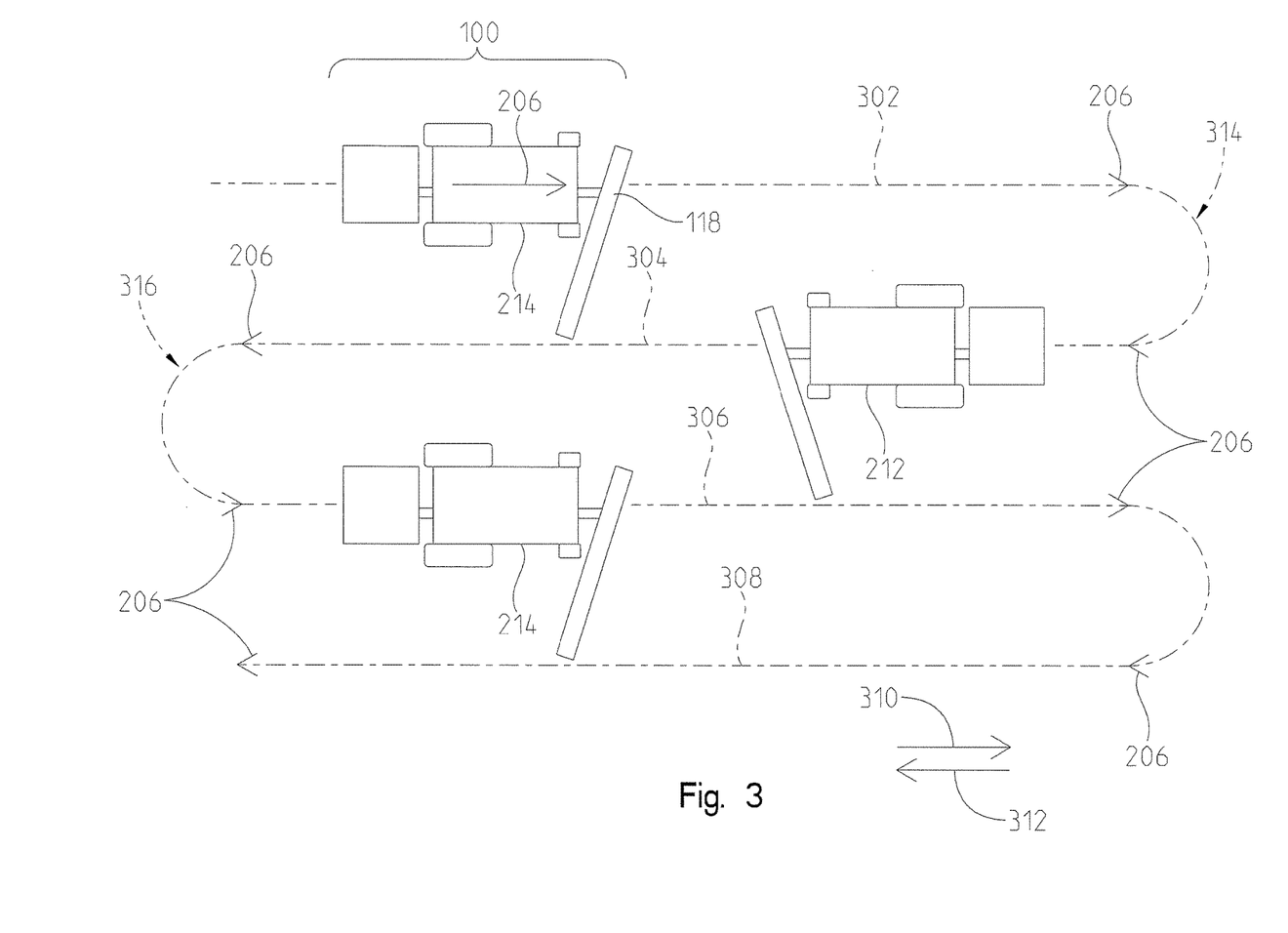
FIG. 3 is a schematic view of a harvest pattern for the baler system.

Referring now to FIG. 3, a baler harvest pattern 300 is shown. More specifically, the baling system 100 may move in the direction of travel 206 over a plurality of windrows 302-308 in an S-like manner as the baling system 100 progresses through a field of windowed crop. The baling system 100 may travel along the first windrow 302 and have a direction of travel 206 going a first direction 310. Along the first windrow 302, the windrow diverter 118 may be biased towards the second side 214 to redirect crop from the first windrow 302 towards the second windrow 304 when the windrow diverter 118 is in the divert position.

When the baling system 100 approaches the end of the first windrow 302, it may execute a substantially 180 degree turn 314 to begin travelling along the second windrow 304. After the 180 degree turn 314, the baling system 100 may have a direction of travel 206 in the opposite direction 312 relative to when the baling system 100 was travelling along the first windrow 302. Accordingly, the windrow diverter 118 may become biased towards the first side 212 during, or shortly before or after, the 180 degree turn 314. By becoming biased along the first side 212 during the second windrow 304, the windrow diverter 118 may divert the underlying crop towards the third windrow 306 when the windrow diverter 118 is in the divert position. Further still, as the baler system 100 travels along the second windrow 304, any crop diverted from the first windrow 302 may be either formed into a bale 114 or diverted to the third windrow 306 as the baler system 100 travels along the second windrow 304.

The baling system 100 may execute a second substantially 180 degree turn 316 at the end of the second windrow 304 as the baling system 100 enters the third windrow 306. Similar to the first 180 degree turn 314, the windrow diverter 118 may transition from being biased towards the first side 212 to becoming biased towards the second side 214 about when the baling system 100 executes the second 180 degree turn 316. The baling system 100 may then travel along the third windrow 306 and either process the underlying crop into a bale 114 or divert the underlying crop to the fourth windrow 308 as described above.

The baling system 100 can execute the above method for any number of windrows. As described above, the baling system 100 may maintain a substantially constant velocity as it travels along each windrow or change velocities when the windrow diverter 118 is in the divert position. Further, during each wrapping and ejection cycle of the baler 104, the baling system 100 may divert the underlying crop to an adjacent windrow to be picked up by the baling system 100 at a later time. Further still, the baling system 100 may eject the bales 114 onto the crop accumulator 116. The crop accumulator 116 may tow the bales 114 until they are located at a desirable place along the underlying surface. Then, the crop accumulator 116 may release the towed bales 114 to the underlying surface to be retrieved later.

While the baling system 100 has been described as implemented on adjacent windrows that are substantially parallel to one another, this disclosure applies to many different windrow configurations as well. More specifically, one continuous windrow may be configured in a spiral-like placement throughout a field. In this embodiment, the baling system 100 may not need to make any 180 degree turns as described above. Further still, in this example the windrow diverter 118 may not need to become biased towards more than one side. In one non-exclusive example, the baling system 100 may start at a radially outer portion of the spiraled windrow. The windrow diverter 118 may be biased towards the center of the spiral as the baling system 100 travels around the spiraled windrow. Accordingly, when the windrow diverter 118 is in the divert position, the underlying crop may be directed to the adjacent windrow that is closer to the center of the spiral.

Alternatively, in the spiraled windrow embodiment described above, the baling system 100 may start at a center portion of the spiral and compile the crop within the windrow into bales 114 as the baling system 100 travels along the spiraled windrow radially away from the center portion. In this embodiment, the windrow diverter 118 may be biased away from the center portion to allow the baling system 100 to collected diverted crop as it travels along the spiraled windrow away from the center portion.

The baling system shown and described above can be implemented with any number of windrow orientations and should not be limited to any one. Rather, any type of windrow pattern is considered herein. Further still, while 180 degree turns are described herein, any angle of turn may also apply and 180 degrees has only been used as one non-limiting example.

Figure 4:
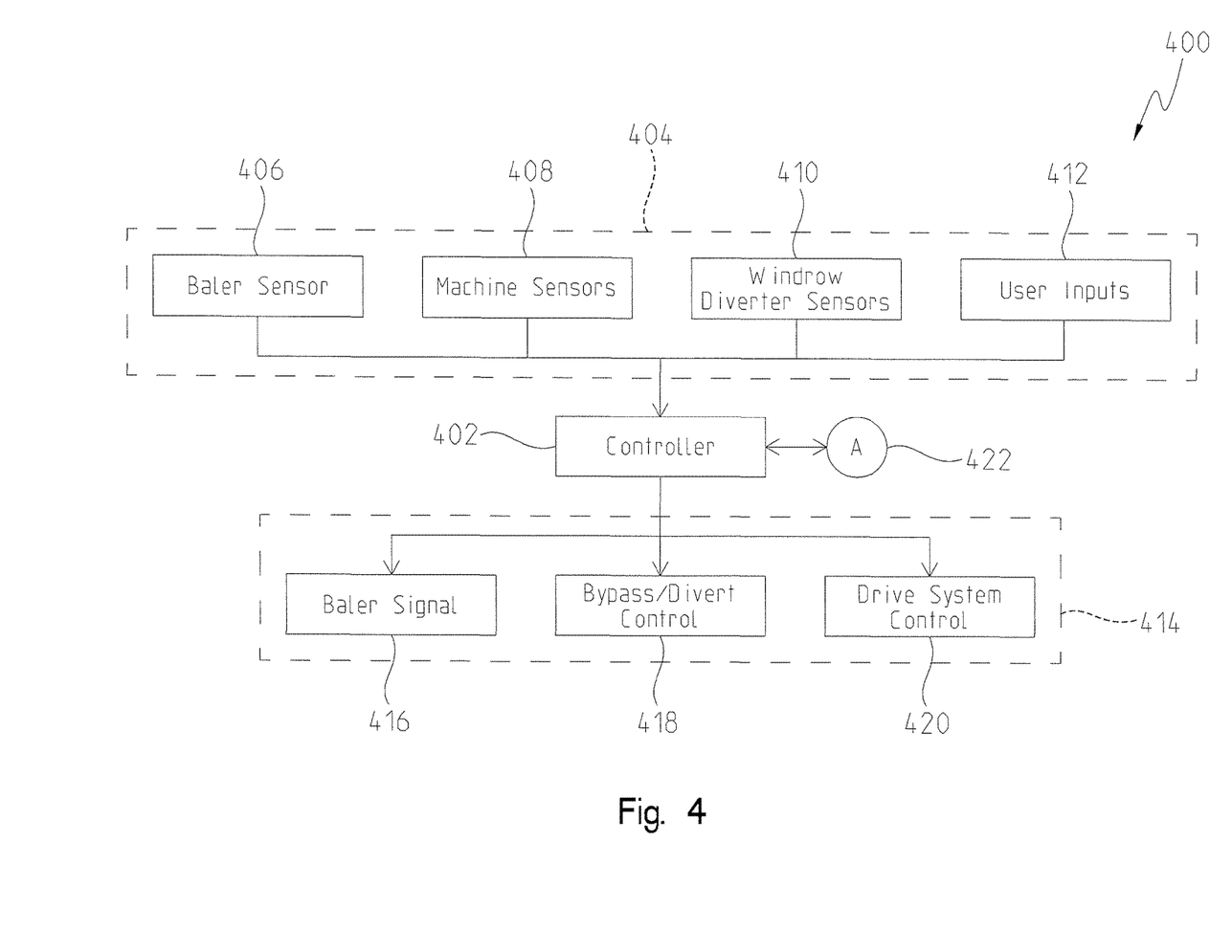
FIG. 4 is a schematic diagram of a controller and components that communicate therewith.

Referring now to FIG. 4, a schematic representation of a control system 400 is shown. The control system 400 may be provided to assist a user in implementing the above-described baling system 100. More specifically, a controller 402 may be in communication with a plurality of sensors 404 to identify different operating conditions of the baling system 100. In one embodiment, a baler sensor 406 may communicate to the controller 402 various conditions of the baler 104. In one non-exclusive example, the baler sensor 406 may include more than one sensor and identify the capacity, fill rate, crop weight, wrapping progress, and bale ejection status, etc. Further still, in one embodiment the baler sensor 406 identifies when crop is traveling through the crop pickup 108.

Similarly, a machine sensor 408 may monitor and communicate different conditions of the tractor 102 or of the drive system of the baler 104. Some non-exclusive examples of conditions monitored by the machine sensor 408 include, but are not limited to, speed, GPS signals, and steering system orientation. Similarly, one or more windrow diverter sensor 410 may identify conditions of the windrow diverter 118. Some non-exclusive examples of conditions monitored by the windrow diverter sensor 410 may be whether it is in the divert position or the bypass position as well as what side of the tractor 102 the windrow diverter 118 is biased towards. One or more user input 412 may also communicate with the controller 402 to allow the user to provide commands or other information to the controller 402. Several non-limiting examples of the types of user inputs 412 may include a user command to engage the baler 104, control the speed or direction of the tractor 102, reposition the windrow diverter 118, engage an automatic baling procedure, or any other type of user input.

The controller 402 may also communicate a plurality of commands 414 to the baling system 100. More specifically, the controller 402 may communicate a baler signal 416 to identify the status of the baler 104. In one embodiment, the baler signal 416 can be a visual or audio transmission to the user indicating the status of the baler 104. The baler signal 416 may identify when the baler 104 is full or almost full of crop. Among other things, the baler signal 416 may indicate to the user when the wrapping and bale ejection processes are occurring. In another embodiment, the baler signal 416 may be used to allow the controller 402 to selectively control the functions of the baler 104. In this non-limiting example, the controller 402 can instruct the baler 104 to operate the crop pickup 108 and capture and process underlying crop, to compile bales 114 on the crop accumulator 116, to release the crop accumulator 116, and instruct the baler 104 to execute a wrap and eject the bale 114. In another embodiment, the baler signal 416 may not be indicated to the user at all. In this embodiment, the baler signal 416 is communicated to the controller 402 to process without substantial user intervention.

One of the plurality of commands 414 of the controller 402 may be a bypass or divert command 418. In one embodiment, the controller 402 may selectively position the windrow diverter 118 in the bypass position or the divert position. Similarly, the controller 102 may communicate a control command 420 to the tractor 102 or drive system of the baler 104. The control command 420 may operatively control the power and steering for the tractor 102 or baler's 104 drive system among other things. In this embodiment, the controller 402 utilizes any of the automated systems of baling system 100 to control the position of the baler 104.

The controller 402 may have a control algorithm 422 stored in a memory unit of the controller 402. The controller 402 may also have one or more processors capable of executing the control algorithm 422 stored in the memory unit. While one controller has been shown and described above, this disclosure considers any number of controllers. In one embodiment, the baler 104 may have a controller that executes the control algorithm 422. In another embodiment, a controller on the tractor 102 may execute the control algorithm 422. In yet another embodiment, the windrow diverter 118 has a controller that executes the control algorithm 422. Further still, a combination of any of the controllers described above may each control part of the control algorithm 422. Accordingly, this disclosure considers any number of controllers and is not limited to any particular controller from any particular system.

Figure 5A:
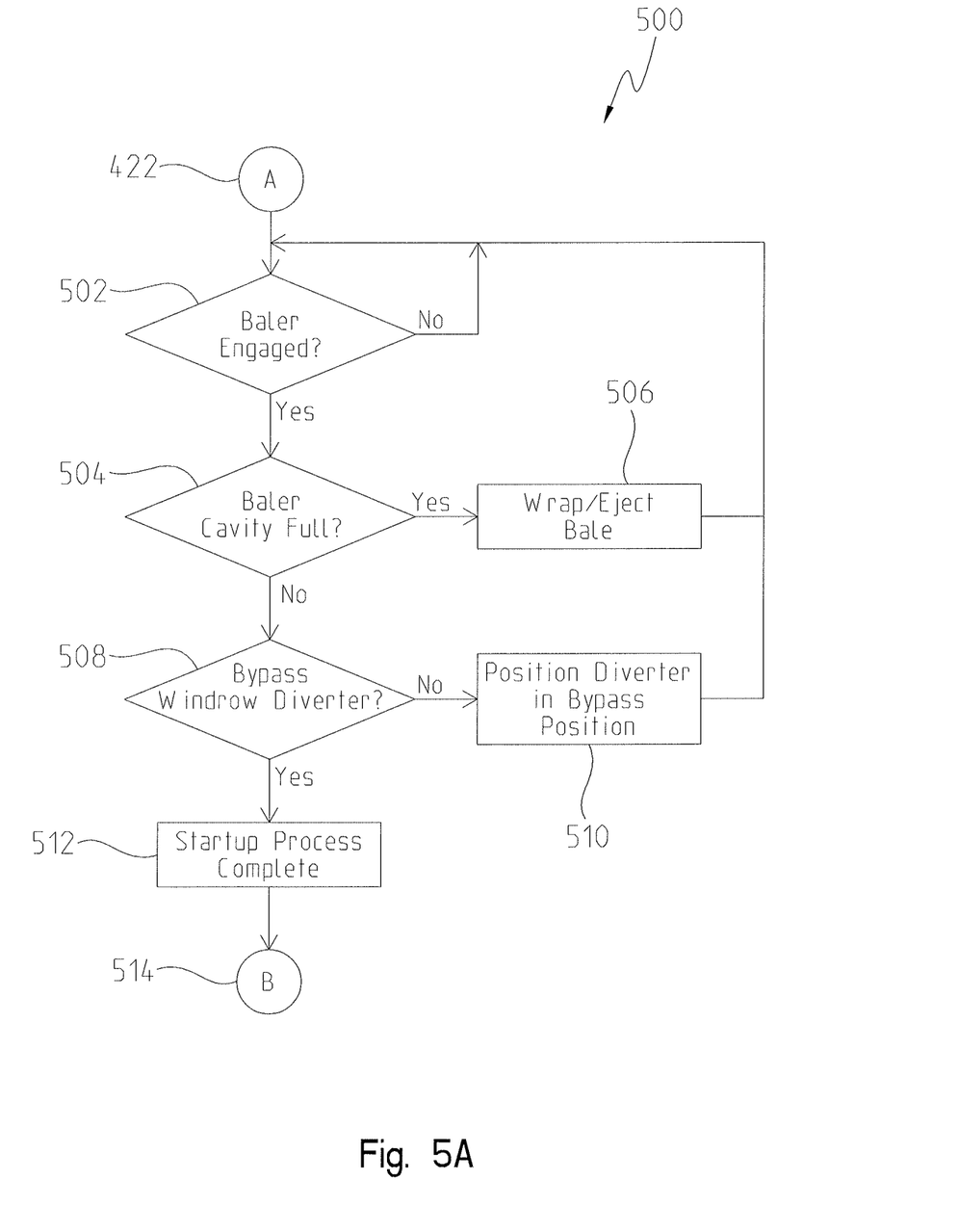
FIG. 5A is a schematic view of a control algorithm.

Referring to FIG. 5A, a non-exclusive example of a logic flowchart or process 500 is shown. The logic may form part of the aforementioned control algorithm 422. It may also include one or more blocks executed by the controller 402 according to the teachings of this disclosure. In a first block 502 of the process 500, an initial inquiry is made by the controller 402 to determine whether the user input 412, or other indicator, has communicated to the controller 402 to engage the baler 104 to gather crop or other underlying debris. In one embodiment, the user input 412 may be a switch or touch-screen device in the tractor 102. If the controller 402 has not identified a command to engage the baler 104, the algorithm 422 may loop back to the block 502 and continue to check for a user input 412 to engage the baler 104.

If the controller 402 receives a command to engage the baler 104, the controller 402 may check if the baler is full block 504. If the baler 104 is full, the controller 402 may communicate with the baler 104 to execute a wrap and eject the bale cycle in block 506. Further, the baler 104 may also position the windrow diverter 118 in the divert position to divert any windrows thereunder when the controller 402 identifies that the baler is full 504. After the wrap and eject the bale cycle in block 506 has been executed, the algorithm 422 may return to block 502 and repeat the above-described steps.

If the baler 104 is not full in block 504, the controller 402 may continue to a windrow diverter position check in block 508. During the windrow diverter check, if the controller 402 identifies that the windrow diverter 118 is in the divert position, the controller 402 may execute a bypass the windrow diverter command in block 510 to position the windrow diverter 118 in the bypass position. After the windrow diverter 118 is positioned in the bypass position, the controller 402 may return to block 502 and repeat all of the above-described steps and processes as necessary.

If the controller 402 identifies that the windrow diverter 118 is in the bypass position at the windrow diverter position check in block 508, the controller 402 may deduce that an initial setup process is complete in block 512. After the initial setup process is complete in block 512, the control process 500 may advance so that the controller 402 executes a bale logic cycle 514.

Figure 5B:
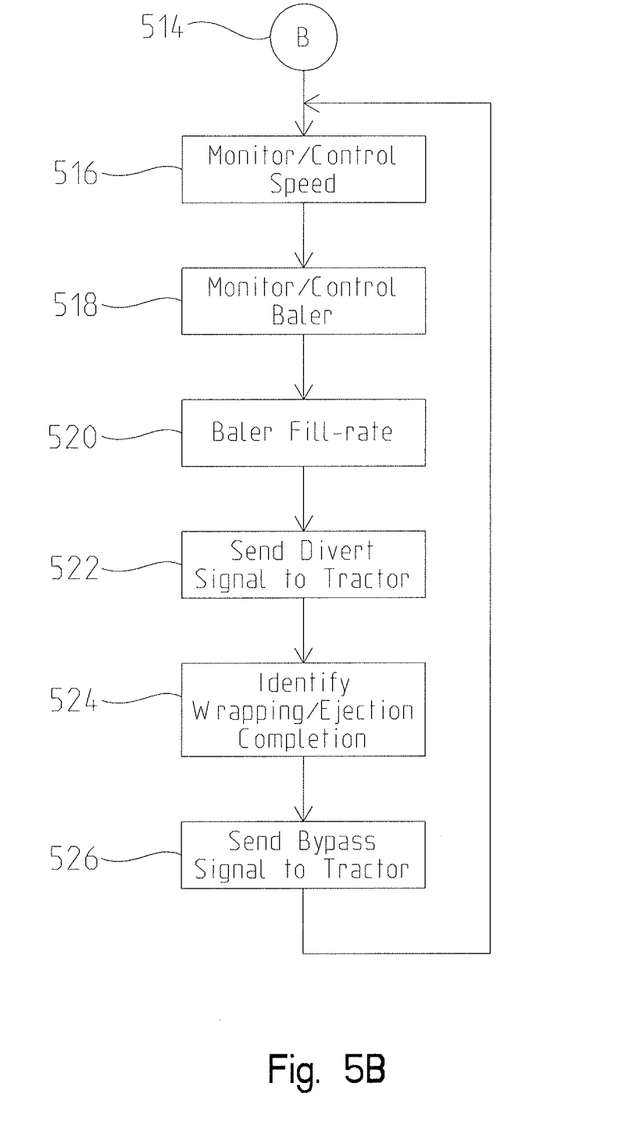
FIG. 5B is a schematic diagram of a bale logic cycle.

Referring to FIG. 5B, one embodiment of the bale logic cycle 514 is shown. During the bale logic cycle 514, the controller 402 can monitor and control tractor or drive system speed in block 516, monitor and control the baler 104 in block 518, identify and calculate baler fill-rate in block 520, send a divert signal to the tractor or windrow diverter in block 522, identify when crop is entering the crop pickup 108 and the status of the wrapping and eject the bale cycle in block 524, and send a bypass position signal to the tractor or windrow diverter in block 526 among other things.

During the bale logic cycle 514, the controller 402 may monitor and control the tractor or drive system speed in block 516 to anticipate when the baler 104 may become full and need to execute the wrapping and eject cycle in block 524. More specifically, the tractor or drive system speed in block 516 may be utilized by the controller 402 to identify when the windrow diverter 118 should be lowered to divert crop while the baler 104 executes the wrapping and eject cycle. In one embodiment, the controller 402 monitors the baler in block 518, the tractor or drive system speed in block 516, and when crop is entering the crop pickup 108, to identify or otherwise determine the baler fill rate in block 520. The baler fill rate in block 520 may be the rate at which the baler 104 fills with crop at the measured tractor or drive system speed in block 516. In one non-exclusive embodiment, the controller 402 may calculate the baler fill rate in block 520 by recording data indicating the speed of the tractor or drive system along with the capacity of the baler 104. The controller 402 may then generate an estimated fill-rate of the baler 104 based on the tractor or drive system speed and the recorded historical data.

In one embodiment, the baler fill rate in block 520 may be used by the controller 402 to identify the proper time to move the windrow diverter 118 to the divert position and allow the baler 104 to execute the wrapping and eject cycle. In this embodiment, the controller 402 may move the windrow diverter 118 to the divert position based on the anticipated fill rate in block 520 to ensure crop is not bypassed by the windrow diverter 118 when the baler 104 is full.

The divert signal in block 522 may be sent to the tractor 102 or baler 104 to visually or audibly indicate to the user to move the windrow diverter 118 to the divert position. Alternatively, the divert signal in block 522 may be communicated directly to the windrow diverter 118 or other control system to automatically reposition the windrow diverter 118 in the divert position when the baler 104 is becoming full.

The controller 402 may also initiate the wrapping and eject cycle when crop stops entering the crop pickup 108. Further, the controller 402 may identify when the wrapping and eject cycle is complete in block 524 and send the bypass signal in block 526 to the user of the tractor 102 or baler 104 identifying when to orient the windrow diverter 118 in the bypass position. The bypass signal in block 526 may be visually or audibly communicated to the user as an indication for the user to reposition the windrow diverter in the bypass position with the user inputs 412. Alternatively, the bypass signal in block 526 may be communicated to the windrow diverter 118 or other control system to orient the windrow diverter 118 in the bypass position.

Accordingly, in one embodiment the user may be traveling along a windrow of a field or other underlying surface with the baling system 100. When the user utilizes the user inputs 412 to begin the baling process, the baling system 100 executes the control algorithm 422 until the setup process is complete in block 512. Then, the controller 402 monitors the tractor 102 and the baler 104 to determine a baler fill rate in block 520. Based on the baler fill rate in block 520, the controller 402 anticipates or otherwise identifies when the baler 104 is full, allowing the controller 402 to send a signal to the user to orient the windrow diverter 118 in the divert position before the baler 104 is full. The baler 104 continues to travel along the underlying surface and diverting the windrow while the wrapping and eject cycle completes in block 524. Once the wrapping and eject cycle is complete in block 524, the controller sends a signal to the user to orient the windrow diverter 118 in the bypass position to allow the baler 104 to begin accumulating crop again. In one embodiment, the tractor 102 does not substantially change speed throughout the bale logic cycle 514.

In another embodiment, the bale logic cycle 514 may be executed without requiring user interaction. More specifically, after the user engages the user inputs 412 indicating a desire to initiate the control algorithm 422, the controller 402 may monitor and control the baling system 100 to allow for the non-stop baling process described above. In this embodiment, the divert signal in block 522 may be communicated to the windrow diverter 118 to transition the windrow diverter 118 to the divert position at the controller's 402 command, thus not requiring user interaction. Similarly, the bypass signal in block 526 may be communicated from the controller 402 to the windrow diverter 118 to orient the windrow diverter in the bypass position after the wrapping and eject cycle completion in block 524.

In one embodiment, the windrow diverter control algorithm 422 may have a predefined or predetermined distance stored by the controller 402 that represents the space between the windrow diverter 118 and the baler 104. In this embodiment, the distance between the windrow diverter 118 and the baler 104 may be used along with the tractor speed in block 516 and baler fill-rate in block 520 to identify when the windrow diverter 118 should be lowered to avoid missing any crop or overfilling the baler 104. In this embodiment, the windrow diverter 118 may move to the divert position before the baler 104 is completely full, such as, for example, when the crop remaining between the windrow diverter 118 and the baler 104 will sufficiently fill the baler 104 to thereby trigger execution of the wrapping and eject cycle in block 524.

In the bale logic cycle 514, the controller 402 may also control the bias of the windrow diverter 118. More specifically, during the bale logic cycle 514, the controller 402 may identify when the tractor 102 executes a substantially 180 degree turn and bias the windrow diverter 118 to the opposite side at such an occurrence. Further still, during the bale logic cycle 514, the controller 402 may also control when the accumulator 116 releases the bales positioned thereon. In this embodiment, the controller 402 may communicate with a GPS signal to identify a pre-programmed geographical location within a given area or field. When the baling system 100 is positioned at the geographic location, it may release any bales 114 positioned on the crop accumulator 116.

Further still, in another embodiment the speed of the baler 104 may be altered by the controller 402 during the divert signal in block 522. In this embodiment, the tractor 102 or drive system speed may be reduced during the wrapping and eject cycle completion step in block 524. Once the wrapping and eject cycle is complete, the controller 402, while executing the bypass signal in block 526, may also send a signal to increase the speed of the tractor 102 or drive system as described above.

While the control algorithm 422 and bale logic cycle 514 have been described above in a particular order, the steps and process described therein are not limited to a particular order. Rather, all of the steps and processes described above may be executed at substantially the same time. Alternatively, the steps and processes described above may be executed in an order that is different than the one shown.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A baling system, comprising:
 a work machine including a chassis and a drive system for driving the work machine in a direction of travel along a ground surface;
 a baler coupled to the work machine, the baler including a crop pickup assembly and a housing for defining an internal chamber, where the crop pickup assembly is configured to collect crop in the chamber from an underlying windrow located on the ground surface in the direction of travel as the baler moves along the underlying windrow;
 at least one sensor coupled to the baler, the sensor configured to detect an amount of crop collected in the chamber; and
 a windrow diverter having a divert position and a bypass position, the windrow diverter disposed at a location forward of the crop pickup assembly relative to the direction of travel;
 wherein, when the amount of crop detected by the sensor in the chamber exceeds a threshold amount, the baler operably executes a wrap or eject cycle and the sensor transmits a first signal for operably controlling the windrow diverter to its divert position;
 wherein, in the divert position, the windrow diverter operably diverts the crop from the underlying windrow along the round surface to an adjacent ground surface in a direction away from the crop pickup assembly as the baler continuously moves in the direction of travel.

2. The baling system of claim 1, wherein the windrow diverter is operably disposed at an angle relative to the direction of travel to divert the crop of the underlying windrow to either side of the baler and out of alignment with the underlying windrow and the crop pickup assembly.

3. The baling system of claim 1, wherein the sensor operably detects when either the wrap or eject cycle is complete and transmits a second signal indicative of completion of either process; and
 the windrow diverter being operably controlled to its second bypass position upon detecting execution of either process or transmission of the second signal.

4. The baling system of claim 3, wherein the first and second signals comprise a visual or audio signal.

5. The baling system of claim 3, further comprising a control system including a controller disposed in electrical communication with the baler and the windrow diverter, the controller selectively controlling the windrow diverter to either of its divert or bypass position;
 wherein, the at least one sensor is in electrical communication with the controller such that the controller receives the first signal and second signal from the sensor;
 further wherein:
 upon receiving the first signal, the controller operably controls the windrow diverter to its divert position; and
 upon receiving the second signal, the controller operably controls the windrow diverter to its bypass position.

6. The baling system of claim 1, wherein, in its bypass position, the windrow diverter is operably disposed relative to the underlying windrow such that the debris does not come into contact with the windrow diverter.

7. The baling system of claim 1, wherein the baler comprises a drive system for independently driving the baler.

8. A method for continuous baling of crop in a windrow disposed on a ground surface, comprising:
- providing a baler including a crop pickup assembly and a housing for defining a chamber, a drive system, a windrow diverter coupled to the baler and having a first position and a second position, and a control system including a sensor and a controller in communication with the sensor, the drive system, the baler, and the windrow diverter;
- driving the baler by the drive system in a direction of travel along the ground surface;
- disposing the windrow diverter in its second position;
- collecting crop with the crop pickup assembly along a windrow of crop as the baler moves in the direction of travel and the windrow diverter is in its second position;
- storing collected crop in the internal chamber of the baler;
- detecting an amount of crop stored in the chamber with the sensor;
- communicating the amount of stored crop detected in the chamber to the controller;
- comparing, with the controller, the detected amount of stored crop with a threshold amount;
- executing a wrap cycle to form a bale of crop with the baler if the detected amount of stored crop satisfies the threshold amount;
- operably controlling the windrow diverter to its first position by the controller during the executing step and as the baler moves in the direction of travel; and
- disposing the windrow diverter at an angle relative to the direction of travel in the first position to divert the crop from the windrow being baled to the ground surface on either side of the baler and out of alignment with the windrow being baled; and
- discontinuing the collecting step when the windrow diverter is in its first position.

9. The method of claim 1, further comprising:
- ejecting the bale of crop from the chamber when the windrow diverter is in its first position; and
- continuously driving the baler in the direction of travel during the ejecting step.

10. The method of claim 9, further comprising:
- detecting with the sensor when the executing or ejecting step is completed;
- transmitting a signal to the controller when the executing or ejecting step is completed; and
- operably controlling the windrow diverter to its second position by the controller.

11. The method of claim 9, further comprising reducing a speed of the baler in the direction of travel during the executing or ejecting steps.

\* \* \* \* \*